VESTIGIAL SIDEBAND FREQUENCY SHIFT KEYING MODEM

Filed March 3, 1966 6 Sheets-Sheet 1

SOLID LINE: MODULATING SIGNAL AND INSTANTANEOUS FREQUENCY CHANNEL INPUT

DASHED LINE: INSTANTANEOUS FREQUENCY CHANNEL OUTPUT

INVENTORS
RICHARD W. CALFEE
EMIL HOPNER
ORMAN F. MEYER
LYNN P. WEST

By Arthur Decker
ATTORNEY

VESTIGIAL SIDEBAND FREQUENCY SHIFT KEYING MODEM

Filed March 3, 1966

VESTIGIAL SIDEBAND FREQUENCY SHIFT KEYING MODEM

Filed March 3, 1966 6 Sheets-Sheet 3

VESTIGIAL SIDEBAND FREQUENCY SHIFT KEYING MODEM

Filed March 3, 1966 6 Sheets-Sheet 4

United States Patent Office 3,466,392

Patented Sept. 9, 1969

3,466,392
VESTIGIAL SIDEBAND FREQUENCY SHIFT KEYING MODEM

Richard W. Calfee, San Jose, Emil Hopner and Orman F. Meyer, Los Gatos, and Lynn P. West, San Jose, Calif., assignors to International Business Machines Corporation, Armonk, N.Y., a corporation of New York Filed Mar. 3, 1966, Ser. No. 531,488
Int. Cl. H04l *27/00;* H04b *1/00, 1/62*
U.S. Cl. 178—66 7 Claims

ABSTRACT OF THE DISCLOSURE

A binary communication system having an oscillator that is frequency modulated by a binary signal that is twice the frequency of the output signal. The output of the oscillator is connected to a vestigial sideband filter to thereby provide the frequency modulated vestigial sideband output. At the receiving end, there is a detector that detects transitions to provide an output pulse for each transition which is then filtered to provide an appropriately coded three-level signal.

This invention relates to a communications modem (modulator-demodulator) and, more particularly, to a modem capable of unusually high speed communication of binary information over readily available lines, through utilization of a combination of vestigial-sideband frequency modulation and three-level coding techniques.

Conventional double-sideband (DSB) modulation requires a transmission bandwidth of at least twice that of the modulation signal. For amplitude modulation (AM), the requirement is exactly twice the signal bandwidth; for frequency (FM) and phase modulation (PM), it may be even higher, depending on the permissible distortion and the modulation index $\beta$ (the ratio of the maximum deviation from the center frequency, $f_c$, to the modulating frequency $f_m$). To utilize the bandwidth efficiently for FM and PM, $\beta$ should be small ($<0.5$) so that the bandwidth is as close as possible to that for AM.

In order to transmit binary information at high speed, i.e., 4800 bauds, over a channel bandwidth of no more than that available on leased telephone lines, i.e., 2300 c.p.s., efficient bandwidth utilization techniques must be chosen. For transmission, FM is attractive because it has been suggested as a standard for low speeds and appears adaptable for high speed operation. Also, since, for DSB, the same information is contained in both sidebands, vestigial sideband (VSB) can nearly double the speed for a given bandwidth, and thus is an attractive choice for modulation. In addition, binary coding in three voltage levels (duobinary) is, as well known, an efficient bandwidth compression technique and thus also comprises a good choice.

It is an object of this invention to provide a communications system capable of handling binary data at speeds in excess of those which previously characterized communications of high reliability and limited bandwidth. Associated with this object, it is a further object to provide for the requirements normally associated with binary communications such as synchronization and clocking.

It is another object of this invention to accomplish the foregoing utilizing VSB communications and FM modulation in a combination which absorbs the advantages of both of these systems.

It is still another object of this invention to provide a modem capable of communicating the analog signals of facsimile documentation and similar applications.

It is an additional object of this invention to teach how the techniques of VSB, FM and three-level coding may be combined in a practicable and economical communications system.

The foregoing and other objects, features and advantages of the invention will be apparent from the following more particular description of a preferred embodiment of the invention, as illustrated in the accompanying drawings.

Figure 1:
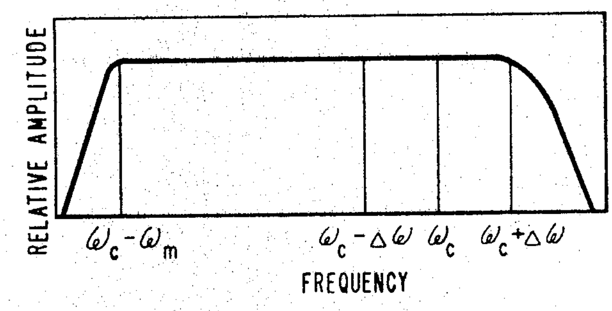
FIGURE 1 is a graph of the theoretical pass band of a VSB filter.

The present invention comprises a VSB–FM modem developed in accordance with the following considerations.

An FM signal may be represented as $$S(t)=\cos(w_ct+\beta \sin w_mt) \quad (1)$$
$$=\cos w_ct \cos(\beta \sin w_mt)-\sin w_ct \sin(\beta \sin w_mt)$$

where:

$S(t)$=instantaneous signal amplitude
$t$=time
$w=2\pi f$
$f_c$=center frequency
$f_m$=sine wave modulating frequency
$\beta$=modulation index For $\beta<0.5$, $$\cos(\beta \sin w_mt)\cong 1$$
$$\sin(\beta \sin w_mt)\cong\beta \sin w_mt$$

Therefore, for $\beta<0.5$, Equation 1 becomes $$S(t)\cong\cos w_ct-\beta \sin w_mt \sin w_ct$$
$$\cong\cos w_ct-(\beta/2)\cos(w_c-w_m)t+(\beta/2)\cos(w_c+w_m)t \quad (2)$$

In a VSB system in which the upper sideband is chosen for deletion, Equation 2 becomes $$S_L(t)=\cos w_ct-(\beta/2)\cos w_c-w_m)t \quad (3)$$
$$=[1+(\beta^2/4)-\beta \cos w_mt]^{1/2}\{\cos[w_ct+\theta(t)]\} \quad (4)$$

where:

$$\theta(t)=\tan^{-1}\frac{(\beta/2)\sin w_mt}{1-(\beta/2)\cos w_mt}$$

In an FM system, the amplitude variations are removed by limiting; Equation 4 becomes $$S_{LL}(t) \cong \cos\ [w_c t + (\beta/2)\ \sin\ w_m t] \quad (5)$$

Comparing Equations 2 and 5, $$S_{LL}(t) = \cos\ w_c t - (\beta/4)\ \cos\ (w_c - w_m)t + (\beta/4)\ \cos\ (w_c + w_m)t \quad (6)$$

Equation 6 represents the original FM waveform with the sidebands down 6 db.

But a binary data waveform has low-frequency components as well as high-frequency components. When these components modulate the FM signal, the above analysis, which contemplates sine wave modulation, is no longer valid. However, for large $\beta$, most of the energy of the FM waveform lies between $w_c \pm (\beta+1)w_m$.

Further, to prevent distortion, the transmitter's VSB filter must pass, without attenuation, the band of frequencies $w_c \pm \Delta w$ ($\Delta w$ is the deviation). FIGURE 1 shows, in graph form, the total pass band theoretically required for the VSB filter.

From the above analysis, it may be expected that high modulating frequencies would be 6 db lower than low modulating frequencies and, to correct this distortion, it would appear that, in the receiver, a complex filter would be required between the limiter and the discriminator. But a reduction to practice according to these principles demonstrated that, at a carrier ($f_c$) of 2700 c.p.s. and a deviation ($\Delta f$) of $\pm 75$ c.p.s., shown in FIG. 2, the waveform was reproduced without distortion, and no correction was required. This result was completely unexpected and indicated a need for further and more complete analysis, involving the following considerations.

If the channel is such that the carrier is decreased 6 db and the upper sideband eliminated, Equation 3 above becomes $$S'_L(t) = (\tfrac{1}{2})\ \cos\ w_c t - (\beta/2)\ \cos\ (w_c - w_m)t \quad (3')$$

$$= \tfrac{1}{2}(1+\beta^2 - 2\beta\ \cos\ w_m t)^{1/2}[\cos\ w_c t + \theta(t)] \quad (4')$$

where:

$$\theta(t) = \tan^{-1} \frac{\beta\ \sin\ w_m t}{1 - \beta\ \cos\ w_m t}$$

When amplitude variations are removed by limiting (in the demodulator), $$S_{LL}(t) \cong \cos\ (w_c t + \beta\ \sin\ w_m t) \quad (5')$$

Figure 2:
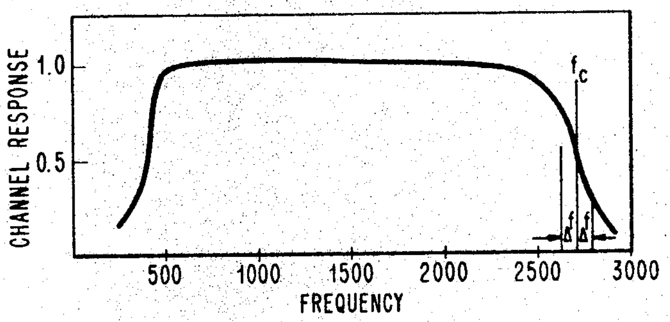
FIGURE 2 is a graph of the theoretical pass band of a 2400 baud VSB–FM system based on FIGURE 1 constraints.

Further, it was shown experimentally in the above reduction to practice that, in the receiver, when the waveform is limited before being detected, low modulating frequencies (large $\beta$) are passed through a filter with a characteristic as shown in FIG. 2 without distortion. Thus, limiting not only restores the upper sideband for high modulating frequencies, but corrects the "tilt distortion" of the deviation range that affects low modulating frequencies. For instance, if the modulating waveform is that shown in FIG. 3, then this waveform represents the instantaneous frequency of the resulting FM waveform and also the amplitude characteristics of the waveform after it has passed through the filter of FIG. 2. For DC signals (all ones or all zeroes), such as may characterize binary data, the output of the frequency modulator is a steady frequency, which must be detected at the receiver, even though it may be attenuated somewhat by the channel. Thus, for low data rates, the deviation is fixed by the upper frequency cutoff of the channel, corresponding to $+1\Delta f$ (where $\Delta f$ is the DC deviation) of FIG. 3; but at high modulating frequencies, it is advantageous to increase the maximum deviation to as much as $\pm 4\Delta f$.

Figure 3:
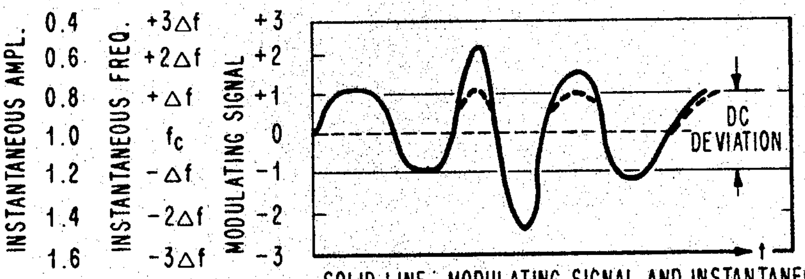
FIGURE 3 is a graph showing a modulating signal and instantaneous frequency of the resulting FM signal after passing through a VSB–FM system having a pass band as depicted in FIGURE 2.

As indicated, the instantaneous frequency output of the modulator is shown in FIG. 3. Since the channel cannot pass the high frequencies, the instantaneous frequency output of the channel is distorted (dashed waveshape), with the result that the deviation becomes asymmetric. For negative excursions, the instantaneous frequency deviation is not affected; for positive excursions, distortion of instantaneous frequencies by the channel results in lower deviation. If the resulting waveform is then discriminated, the combination of amplitude variations in the input signal and the asymmetric deviation caused by the loss of high frequencies in the channel produces output distortion.

If the channel has linear phase characteristics over the DC deviation range, the zero crossings are preserved, and the tilt distortion of the FM signal is removed. The FM waveform can then be accurately reconstructed by limiting. When larger deviations are allowed, the reconstruction of the upper sideband by limiting makes it possible to detect the higher frequencies, even though the corresponding instantaneous frequencies are not passed by the channel.

An optimum system is one that maximizes the signal-to-noise ratio while minimizing the necessary bandwidth and the distortion due to spectral foldover, improper filtering, etc. In the present system, VSB operation makes optimum use of the available bandwidth and distortion is minimized by keeping the deviation (and therefore $\beta$) small. But to maximize the signal-to-noise ratio, it is necessary to operate with a high $\beta$. The fact that the noise output of a discriminator with white noise input is not flat, but a function of frequency, suggested a possible solution to this problem: increasing the signal-to-noise ratio by the technique of pre-emphasis=de-emphasis.

For the channel described, a carrier of 2700 c.p.s. and deviation of $\pm 75$ c.p.s. appears to give optimum results. However, since $\beta$ is equal to $\Delta f/f_m$, the ratio decreases with increased modulating frequency. Operation for small $\beta$ is, as shown, similar to that of a VSB–AM system, and the resulting frequency components are independent of $\beta$. Therefore, to operate at a maximum signal-to-noise ratio, pre-emphasis of the modulating waveform by 6 db per octave above the point where $\beta=0.4$ was incorporated. Thus, $\beta$ remains constant above this frequency.

For the system under discussion, $\beta=0.4$ at $f=190$ c.p.s. Therefore, a pre-emphasis of 6 db per octave was added to the modulating signal at 200 c.p.s., and the output of the discriminator was equivalently de-emphasized; this technique decreased by 14 db the signal-to-noise ratio necessary to maintain a given error rate; i.e., reliability is considered excellent and acceptable up to a 3600 baud data rate.

In addition to the above considerations, the present system employs another bandwidth compression technique, three-level coding. The resulting modem, embodying all three techniques, SSB, FM and three-level coding, was found to be able to transmit 4800 bauds as reliably as 3600 bauds could be transmitted with binary detection methods. A brief discussion of this type of coding may now be appropriate.

Multilevel coding has long been of interest as a method of increasing the speed of transmission over a band-limited channel, mainly because of the possibility of a considerable increase in data rate, a lowering of the signal-to-noise ratio of only 6 db, and an ease of implementation.

The form of this coding that was developed for the system of this invention was effected as follows:

(1) In the transmitter, the binary non-return-to-zero (NRZ) waveform is converted to an inverted non-return-to-zero (NRZI) code in which, for a bit period, a binary zero is characterized by a transition in level and a binary one is characterized by a constant level.

(2) The NRZI waveform is then passed through the band-limited channel, which results in a smoothed output waveform with three distinct levels.

(3) In the receiver, the three-level waveform is interpreted such that an up or down level is read as a binary one and the middle level as a binary zero.

The advantage of this coding technique is that the three-level signal will remain at any level as long as required by the data pattern, and therefore offers DC transmission capability.

Figure 4:
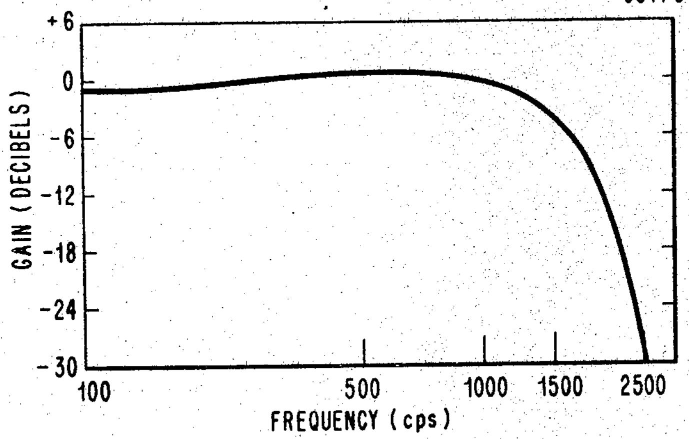
FIGURE 4 is a graph of the overall response of a VSB–FM modem.

A channel described by the graphs of FIGURES 3 and 4, which is capable of 3600-baud transmission in a binary mode, has thus been found able, in a three-level mode, to transmit 4800 bauds with no decrease in reliability or economy. It has been found that, for zero interference at 4800 bits per second, 1200 c.p.s. must be passed without attenuation and 1600 c.p.s. should be attenuated 6 db, as shown in FIGURE 4.

Thus, by combining VSB–FM transmission and a three-level signaling technique, 4800-baud service can be provided over a leased telephone line whose bandwidth is nominally 400 to 2700 c.p.s.

Figure 5:
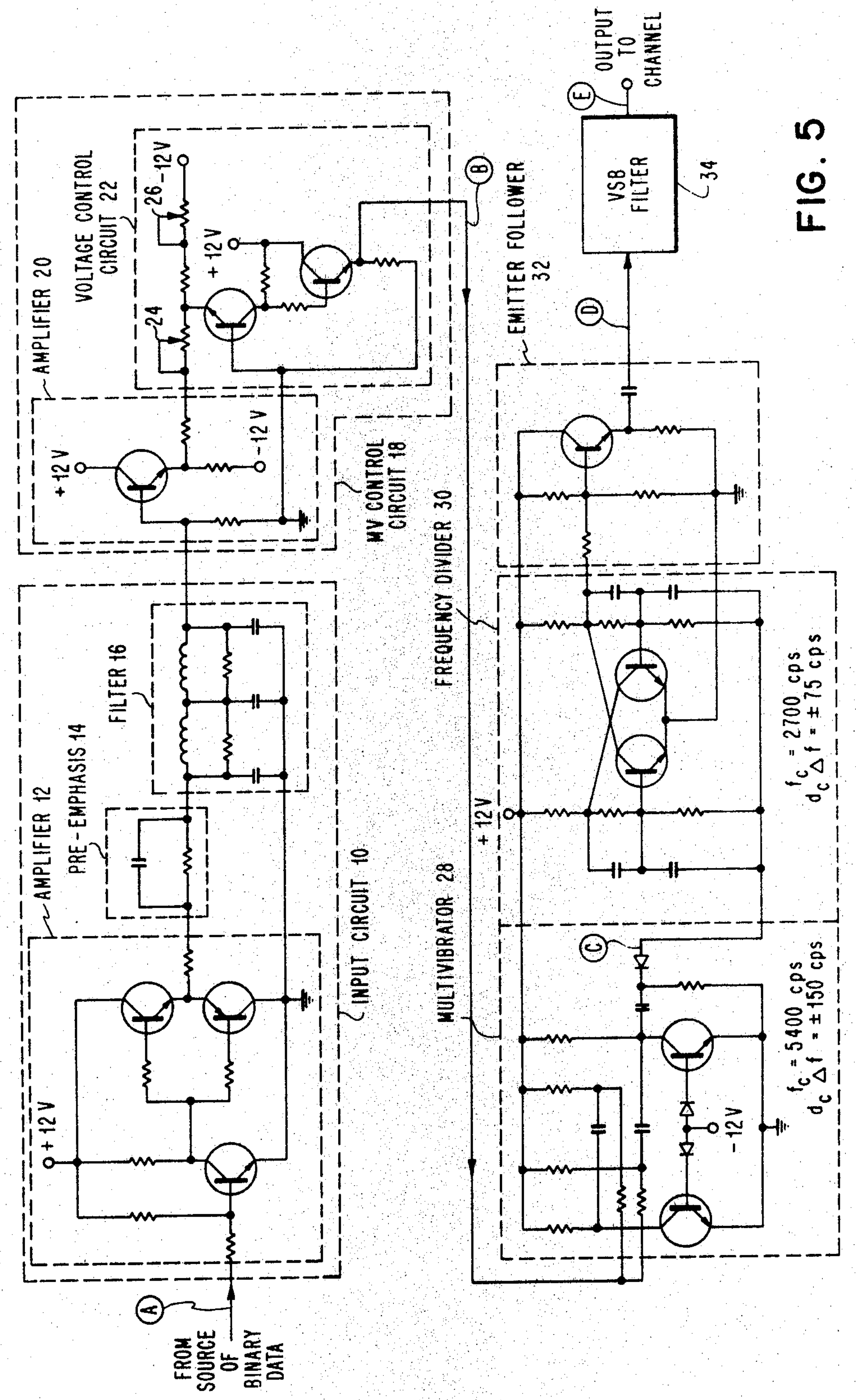
FIGURE 5 is a circuit diagram of the modulator of the invention.

FIGURE 5 presents the circuit diagram of the transmitter modulator contemplating the above principles, as well as the following considerations.

For simplicity, a voltage controlled multivibrator with center frequency ($f_c$) at the desired center frequency of the transmitter output is preferred; however, this type of oscillator would require a complex low-pass input filter with linear phase shift and a sharp cutoff. If the high frequency components of the binary data, near or above the modulator frequency, are allowed to modulate the multivibrator, intermodulation distortion would result. On the other hand, to filter out these high frequency components and still allow the data to be correctly interpreted at the receiver demodulator, the filter must be exceptionally complex. However, it has been found that this complexity can be reduced if the modulator operates at a high center frequency and is divided down to the desired $f_c$. Accordingly, the oscillator embodied in the invention operates at twice $f_c$ and with twice the desired deviation ($\Delta f$), and is coupled to a frequency divider to obtain the desired $f_c$ and deviation; input filtering thus is accomplished by a combination of a simple low-pass filter and a pre-emphasis network.

Figure 6:
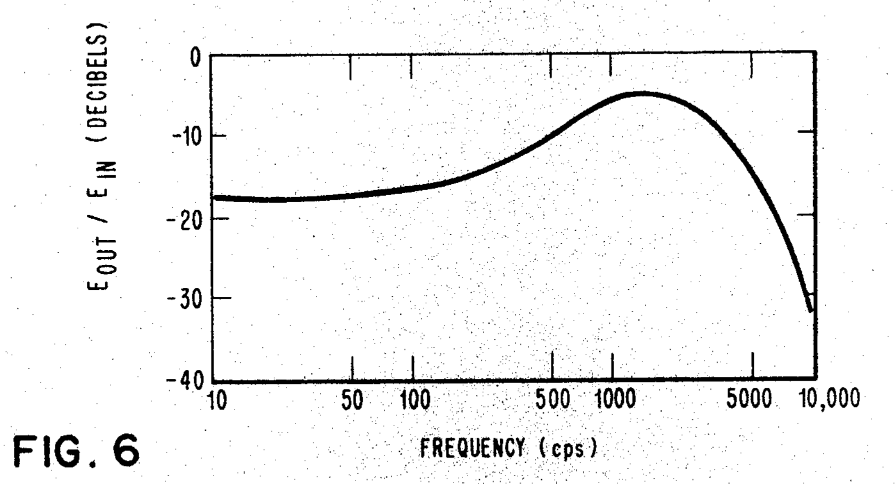
FIGURE 6 shows the amplitude response of the input circuit of the modulator of FIGURE 5.

In the figure, the source of binary data is coupled to input circuit 10 which includes amplifier 12, connected to pre-emphasis network 14; the latter in turn is connected to filter 16. As shown, pre-emphasis network 14 preferably consists of a parallel resistance-capacitance combination well known to operate as above outlined. Filter 16 comprises a modified five-pole Butterworth low-pass filter having a raised cosine impulse response. The overall frequency response of input circuit 10 is shown in FIGURE 6.

Input circuit 10 connects to multivibrator control circuit 18, which includes amplifier 20 feeding voltage control circuit 22. The latter contains a pair of potentiometers 24 and 26, adjustment to which varies the center frequency $f_c$ and frequency deviation $\Delta f$ of multivibrator 28 to which it connects. Multivibrator 28 is seen to be an astable type and is set to 5400 c.p.s. with a deviation of $\pm 150$ c.p.s. Frequency divider 30 receives the output of multivibrator 28 and, since it comprises a binary flip-flop (T element), divides by two to provide an output $f_c$ at 2700 c.p.s. with a $\Delta f$ of $\pm 75$ c.p.s. to emitter follower stage 32.

Figure 7:
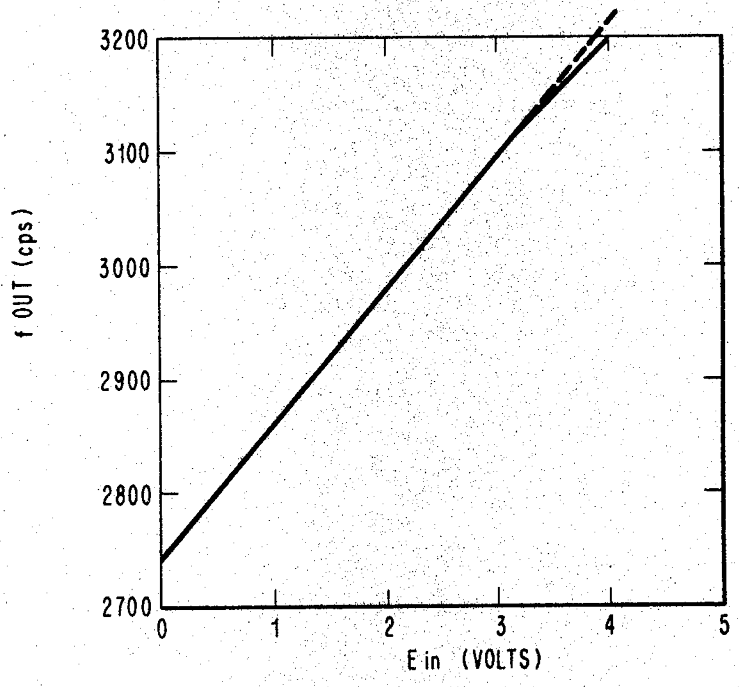
FIGURE 7 is a graph of the transfer characteristic of the modulator of FIGURE 5.

It is to be noted that the circuitry is characterized by a long charging time constant, thereby insuring good linearity, as shown in FIGURE 7, which presents the modulator transfer characteristic (solid line) and, for comparison, a linear trace (dashed line).

The output of emitter follower 32 feeds the transmitter VSB filter 34 and thence the communications channel.

Figure 8:
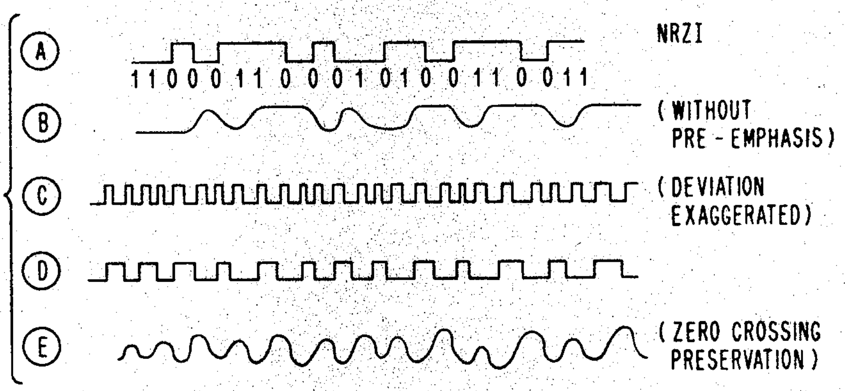
FIGURE 8 shows typical waveforms present at various points of the modulator of FIGURE 5.

FIGURE 8 contains line drawings of signals at various points, drawings A through E, of FIGURE 5, resulting from the NRZI binary data input signal, drawing A. It should be observed, however, that these drawings do not represent the corresponding signals exactly, since, if an exact representation were attempted, crowding of pulses would reduce clarity. Thus, drawing B, as indicated, does not consider the action of pre-emphasis network 14 whereas drawing C exaggerates the frequency deviation $\Delta f$ in order to show the effect of modulation more clearly. Drawing D points up the operation of frequency divider 30 and drawing E shows the communications channel signal, for which it is apparent that the transitions (crossings of the zero reference level) are preserved.

Figure 9:
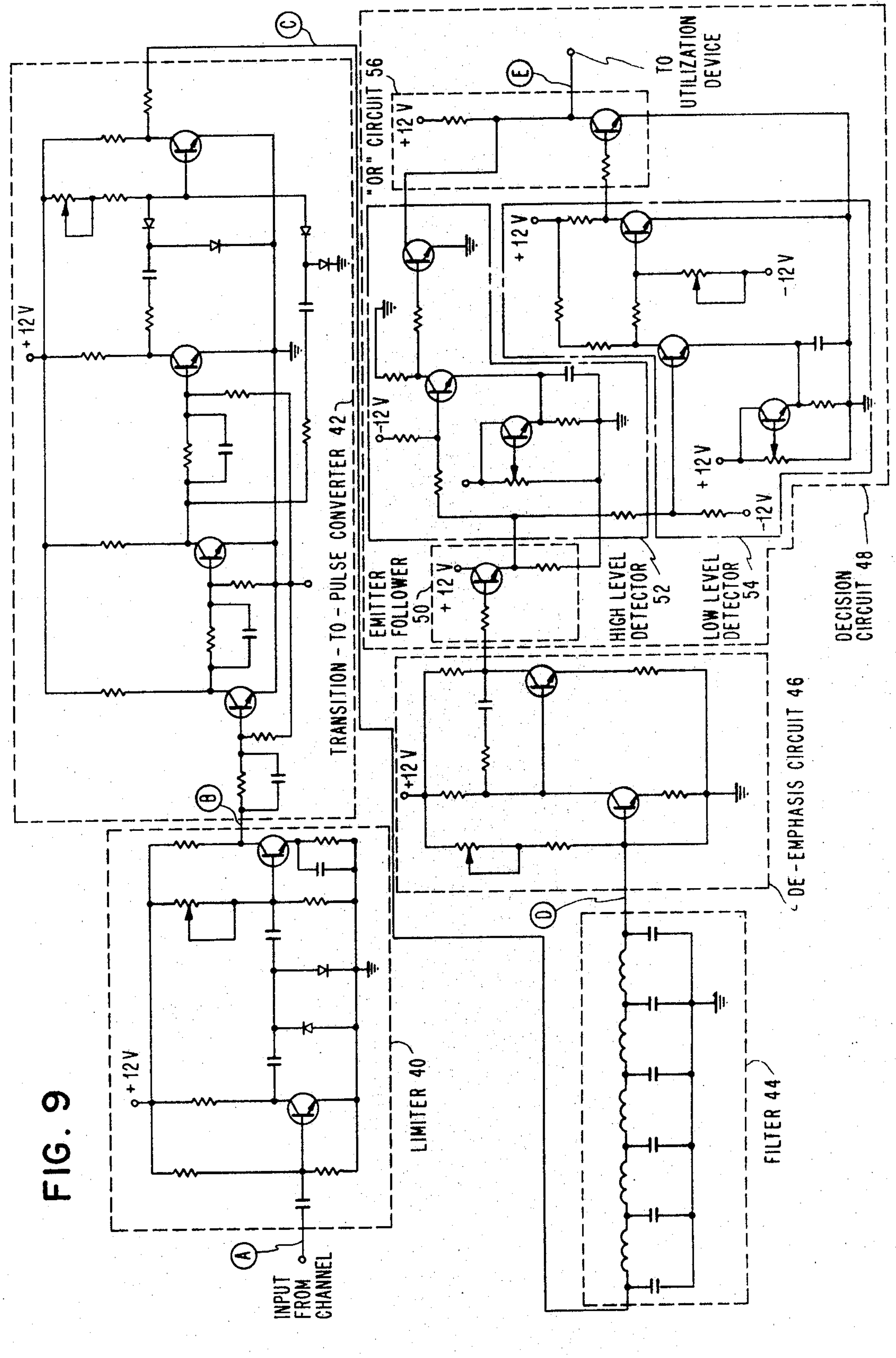
FIGURE 9 is a circuit diagram of the demodulator of the invention.

FIGURE 9 presents the circuit diagram of the receiver demodulator embodying the following considerations.

Since the received waveform is a narrow band (VSB) FM signal whose transitions (zero crossings) contain the coded binary information, the upper sideband components need to be restored and amplitude variations caused by noise or other interference in the communications channel need to be removed. Then the transitions are converted to pulses from which the data may be recovered by filtering; de-emphasis is required to compensate for the pre-emphasis introduced by the modulator. The data then comprises a three-level signal which is translated to a binary code.

Figure 10:
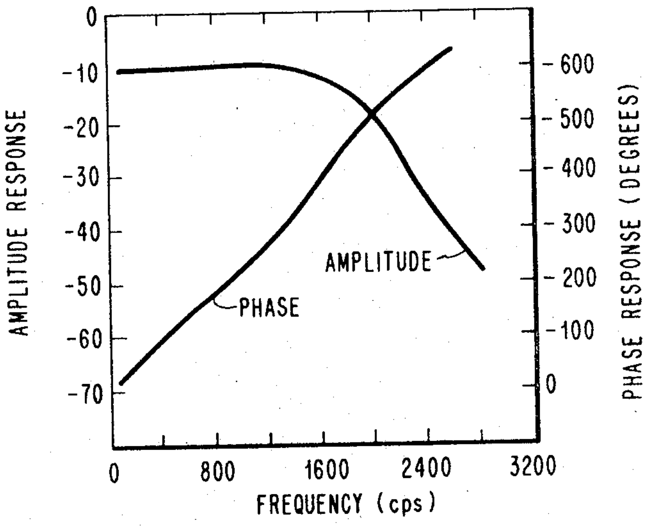
FIGURE 10 shows the amplitude and phase response of the filter of the demodulator of FIGURE 9.
Figure 11:
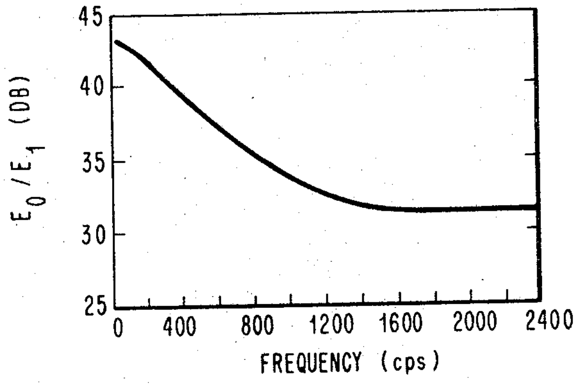
FIGURE 11 shows the gain characteristic of the de-emphasis circuit of the demodulator of FIGURE 9.

In the figure, the communications channel provides input to limiter 40 which, as is known in the art, removes any amplitude variations and restores the upper sideband. Limiter 40 feeds transition-to-pulse converter 42, which provides squaring and sharpening for the transitions and converts them to pulses, each transition in the FM waveform being replaced by a positive pulse of specified height and width. Filter 44 comprises two sections: a six-pole Butterworth low-pass filter cutting off at 1600 c.p.s. and a similar filter, having a cutoff at 2450 c.p.s. which further attenuates the center frequencies of the signal without introducing distortion; reference to FIGURE 10 will divulge the characteristics of filter 44. De-emphasis circuit 46 operates in a fashion complementary to pre-emphasis circuit 14 of FIGURE 5; this circuit includes a feedback network to provide the gain characteristic shown in FIGURE 11. The three-level data signal is converted to a binary signal by decision circuit 48, which translates the "up" and "down" levels to binary one and translates the center level to binary zero.

Referring specifically to decision circuit 48, the three-level signal output from de-emphasis circuit 46 is fed to emitter follower 50 and thence to a paralleled paid of detectors, high level detector 52 and low level detector 54, which respond to levels higher and lower, respectively, than the median. Detectors 52 and 54 connect to OR circuit 56. Thus, if the signal input to decision circuit 48 is higher or lower than, nominally, the zero level, the demodulator output to the utilization device (not shown), which may be an indicator, other receiver circuitry, a computer, etc., comprises a relatively high voltage level generated by detectors 52 and 54 and transmitted through OR circuit 56, whereas, if the signal input is, nominally, at the zero level, the demodulator output comprises a relatively low voltage level generated by detector 54 and transmitted through OR circuit 56.

Figure 12:
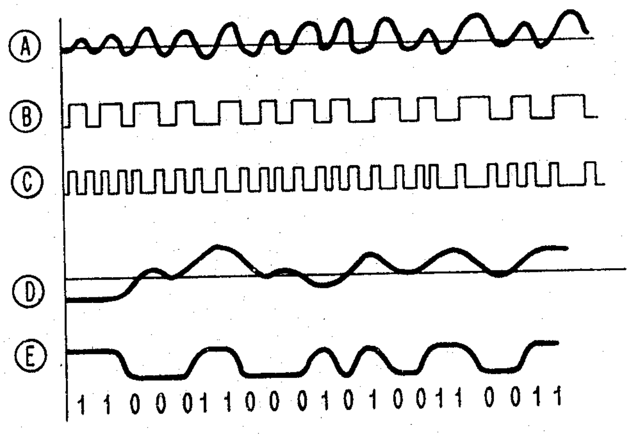
FIGURE 12 shows typical waveforms present at various points of the demodulator of FIGURE 9.

The operation of the demodulator is exemplified by the line drawings of FIGURE 12 in which the waveshapes correspond to the points of FIGURE 9 similarly lettered. For the same reason as given in connection with FIGURE 8, the drawings in this figure are not exactly representative of the signals. Correspondence of drawing E of FIGURE 12 with drawing A of FIGURE 8 is apparent.

Figure 13:
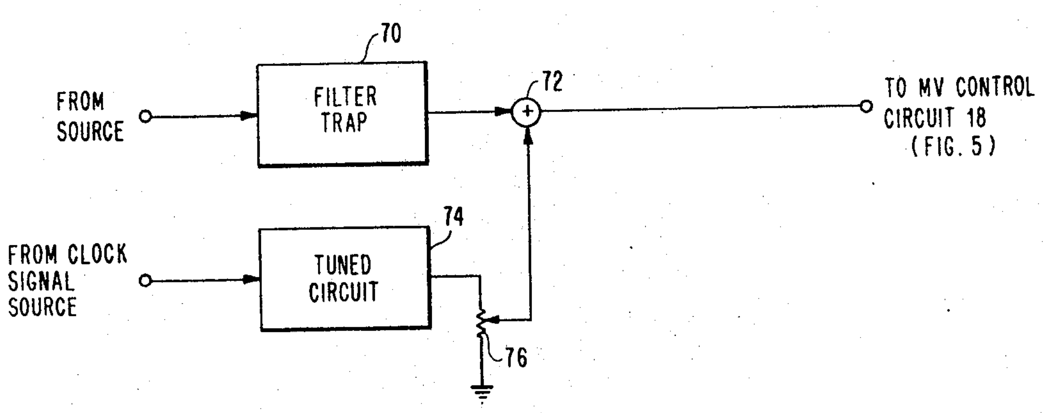
FIGURES 13 and 14 are block and circuit diagrams of clock circuits which may be included in the system of the invention, the former in the modulator of FIGURE 5 and the latter in the demodulator of FIGURE 9.
Figure 14:
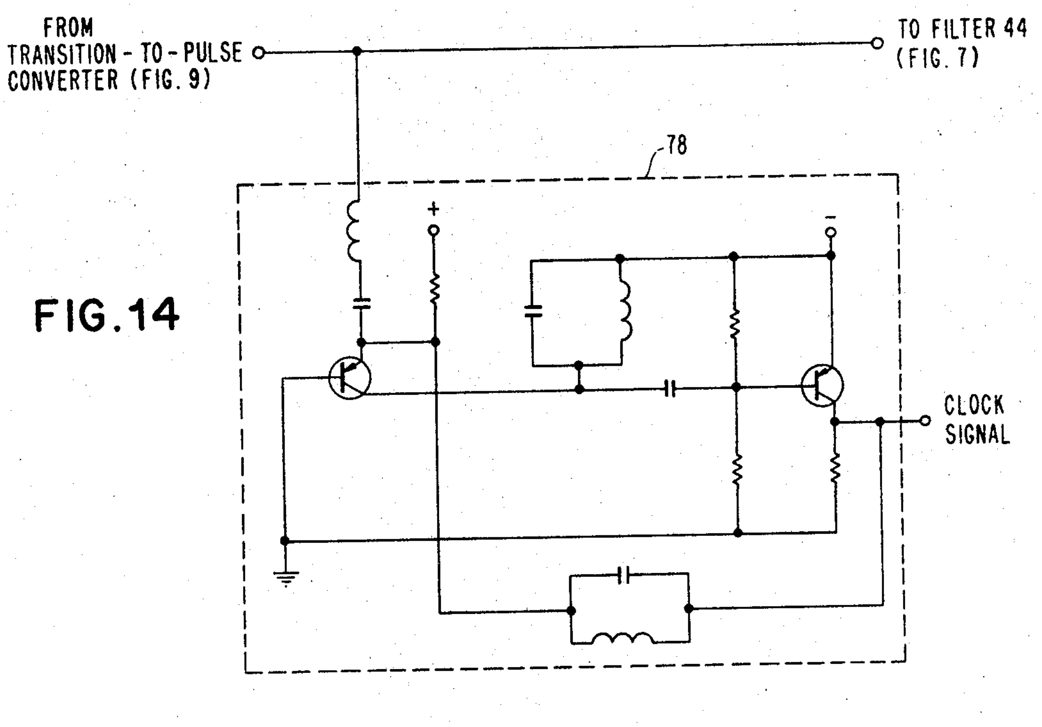

FIGURES 13 and 14 are concerned with circuits which permit significance to be attached to the binary signals, i.e., "clocking" circuits required by any binary communications system. Where the code structure of the system is restricted, such as in the transfer of computer data which is characterized by at least one binary reversal during a specified period of time (usually provided as a parity bit each word period), a "soft" clock, i.e., one derived from the demodulated signal itself, may be used. However, the present system is characterized by independent data and carrier rates and is adaptable to applications wherein no restriction constrains the code structure, such as in document scanning (facsimile). Therefore, it is necessary to employ an independently derived "hard" clock.

FIGURES 13 and 14 show circuits for such a clock, the former for the modulator of FIGURE 5 and the latter for the demodulator of FIGURE 9. With regard to FIGURE 13, filter 16 of input circuit 10 (FIGURE 5) is replaced by filter-trap combination 70, the filter of which comprises a duobinary low-pass network and the trap of which comprises a network responsive to half the repetition rate (bit period) of the binary data. The output of filter-trap 70 provides one input to OR circuit 72, the other input to which is energized by a clock signal source operating at a frequency corresponding to half the bit period of the data, through tuned circuit 74, which resonates at this frequency. The amplitude of the clock signal fed to OR gate 72 is controlled by potentiometer 76. As should be apparent, the action of filter-trap 70 is to preclude data components from interfering with the clock signal at the same rate injected by the clock source. The output of OR gate 72 supplies energization to multivibrator control circuit 18 (FIGURE 5).

With regard to FIGURE 14, in the demodulator (FIGURE 9), all that is required to recover the injected clock signal is tuned circuit 78 having a very high Q at the bit period rate.

The 4800-baud speed of this system has not previously been achieved with an FM modem. Yet the system is basically simple, and it is quite simple to adapt the modem for standard low-speed transmission over switched networks. A further advantage of this system is that the modem is also capable of transmitting the analog signals required for facsimile document scanning and other applications. With this unusual flexibility, the system is very attractive for international data transmission.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. In a binary communications system, an FM–VSB modem, comprising:

a modulator, including
- an input circuit at which the binary signal is impressed;
- an oscillator operating at a multiple of the desired center frequency of the modulator;
- a control circuit capable of deviating the frequency of said oscillator according to the output of said input circuit;
- a frequency divider responsive to said oscillator to provide the desired modulator center frequency modulated accordingly with the output of said oscillator; and
- a vestigial sideband filter connected to said frequency divider;
- a communications channel connected to said modulator; and a demodulator, including
- a limiter at which the signal from said channel is impressed for providing a corresponding two-level signal;
- a transition detector connected to said limiter;
- a low pass filter responsive to the output from said detector for providing a corresponding three-level signal;
- a decision circuit connected to said filter for proproviding a binary signal, said input circuit of said modulator also includes
- a pre-emphasis network effectively increasing the relative amplitude of the high frequency components of said binary signals;

a filter; and said demodulator includes

- a feedback type de-emphasis circuit connected to said low pass filter and having a characteristic complementary to the characteristic of said pre-emphasis network decreasing the relative amplitude of the high frequency components of the output of said filter.

2. In a binary communications system, an FM-VSB modem, comprising:

a modulator, including
- an input circuit at which the binary signal is impressed;
- an oscillator operating at a multiple of the desired center frequency of the modulator;
- a control circuit capable of deviating the frequency of said oscillator according to the output of said input circuit;
- a frequency divider responsive to said oscillator to provide the desired modulator center frequency modulated accordingly with the output of said oscillator; and
- a vestigial sideband filter connected to said frequency divider;
- a communications channel connected to said modulator; and a demodulator, including
- a limiter at which the signal from said channel is impressed for providing a corresponding two-level signal;
- a transition detector connected to said limiter;
- a low pass filter responsive to the output from said detector for providing a corresponding three-level signal;
- a decision circuit connected to said filter for providing a binary signal comprising a pair of threshold detecting circuits and a gating circuit, in which said threshold detecting circuits pass a first level signal to said gating circuit for input signals differing from a reference level by a prescribed deviation and pass a second level signal to said gating circuit for other input signals.

3. The system of claim 2 wherein said gating circuit comprises an OR gate.

4. In a binary communications system, an FM–VSB modem, comprising:

a modulator, including
- an input circuit at which the binary signal is impressed;
- an oscillator operating at a multiple of the desired center frequency of the modulator;
- a control circuit capable of deviating the frequency of said oscillator according to the output of said input circuit;
- a frequency divider responsive to said oscillator to provide the desired modulator center frequency modulated accordingly with the output of said oscillator; and
- a vestigial sideband filter connected to said frequency divider;
- a communications channel connected to said modulator; and a demodulator, including
- a limiter at which the signal from said channel is impressed for providing a corresponding two-level signal;
- a transition detector connected to said limiter;
- a low pass filter responsive to the output from said detector for providing a corresponding three-level signal;
- a decision circuit connected to said filter for providing a binary signal;

said modulator also including
- a clock signal generator and said demodulator also includes
- a clock signal detector.

5. The system of claim 4 wherein the clock signal generated by said generator is independent of the binary signal impressed on said input circuit of said modulator.

6. The system of claim 4 wherein
said clock signal generator comprises
a low pass filter connected to said input circuit;
a clock signal source;
a tuned circuit responsive to the output of said clock signal source to pass a signal at a subharmonic of the frequency of the binary signal and
a gating circuit connected to said input circuit and said tuned circuit to pass a signal to said control circuit.

7. The system of claim 6 wherein said clock signal detector comprises a tuned circuit highly selective at the frequency of the binary signal.

References Cited

UNITED STATES PATENTS

| | | | |
|---|---|---|---|
| 3,196,352 | 7/1965 | Hopner et al. | 325—136 |
| 3,387,213 | 6/1968 | Lender | 178—66 X |
| 3,102,238 | 8/1963 | Bosen | 328—27 |
| 3,307,112 | 2/1967 | Clark | 329—104 |
| 3,288,930 | 11/1966 | Johnson | 325—46 X |

ROBERT L. GRIFFIN, Primary Examiner

W. S. FROMMER, Assistant Examiner

U.S. Cl. X.R.

329—104; 325—27, 320, 163, 136, 46, 30